US009185225B1

(12) United States Patent
Vance (10) Patent No.: US 9,185,225 B1
(45) Date of Patent: Nov. 10, 2015

(54) METHOD AND APPARATUS FOR MODIFYING DIGITAL MESSAGES CONTAINING AT LEAST AUDIO

(75) Inventor: Charles Terry Vance, Roseville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 503 days.

(21) Appl. No.: 13/156,095

(22) Filed: Jun. 8, 2011

(51) Int. Cl.
*H04M 11/00* (2006.01)
*H04M 3/53* (2006.01)
*G10L 19/00* (2013.01)

(52) U.S. Cl.
CPC .................................. *H04M 3/5307* (2013.01)

(58) Field of Classification Search
CPC ... G10L 21/02; H04M 1/6016; H04M 1/7255
USPC ............................ 379/93.15, 100.13, 142.14, 379/88.01–88.19; 704/201–219
See application file for complete search history.

(56) References Cited

U.S. PATENT DOCUMENTS

| | | | |
|---|---|---|---|
| 6,992,245 B2 * | 1/2006 | Kenmochi et al. ............... | 84/622 |
| 7,636,348 B2 | 12/2009 | Bettis et al. | |
| 2001/0052019 A1 | 12/2001 | Walters et al. | |
| 2002/0082828 A1 * | 6/2002 | Hejna, Jr. ...................... | 704/211 |
| 2006/0264209 A1 * | 11/2006 | Atkinson et al. ............ | 455/422.1 |
| 2007/0036290 A1 * | 2/2007 | Gasparri et al. ............. | 379/88.12 |
| 2007/0133437 A1 * | 6/2007 | Wengrovitz et al. ........... | 370/260 |
| 2008/0040106 A1 * | 2/2008 | Nakatsuyama ............... | 704/221 |
| 2008/0167879 A1 * | 7/2008 | Du Bois ......................... | 704/278 |
| 2009/0024389 A1 * | 1/2009 | Khouri et al. .................. | 704/235 |
| 2009/0119100 A1 * | 5/2009 | Akella et al. .................. | 704/235 |
| 2009/0276215 A1 * | 11/2009 | Hager ............................ | 704/235 |
| 2009/0306980 A1 * | 12/2009 | Shin ............................... | 704/235 |
| 2011/0013756 A1 * | 1/2011 | Davies et al. ............... | 379/88.14 |
| 2012/0053938 A1 * | 3/2012 | Trivi ............................. | 704/235 |
| 2012/0094700 A1 * | 4/2012 | Karmarkar et al. .......... | 455/466 |
| 2013/0046538 A1 * | 2/2013 | Harrington ................... | 704/235 |

OTHER PUBLICATIONS

"Visual Voicemail: See it. Play it in any order you like." YouMail, Jun. 7, 2011 <http://www.youmail.com/home/corp/feature.do?name=online>.
"Voice-To-Text Transcriptions," YouMail, Jun. 7, 2011 <http://www.youmail.com/home/corp/feature.do?name=voice2text>.
"Google voice—Features," 2011 Google, Jun. 7, 2011 <http://www.google.com/googlevoice/about.html>.
"Google Voice—Wikipedia, the free encyclopedia," Jun. 7, 2011 <http://en.wikipedia.org/wiki/Google_Voice>.

* cited by examiner

*Primary Examiner* — Solomon Bezuayehu (57) ABSTRACT

A voice and/or video message for a user in the form of a voicemail or a video mail is edited in accordance with editing of text corresponding to audio of the message. Speech contained in the audio of the voice or video message is automatically converted to corresponding text and presented to the user via a graphical user interface. In response to various user inputs in relation to the presentation of the corresponding text, the corresponding text is modified and the digital representation of the voice or video message is modified in a manner corresponding to the modification of the corresponding text. New versions of the modified voice or video message including the modified digital representation of the voice or video message can be created and saved.

24 Claims, 4 Drawing Sheets

METHOD AND APPARATUS FOR MODIFYING DIGITAL MESSAGES CONTAINING AT LEAST AUDIO

TECHNICAL FIELD

The present subject matter relates to techniques and equipment to allow a user of an electronic mailbox to modify a received message, in particular, a voice and/or video message, by editing and/or annotating an automatically generated text version of speech contained in an audio portion of the message.

BACKGROUND

A voicemail service is one of the modern day essential telecommunications services provided by carriers or telecommunications service providers. Generally, the voicemail service provides a 24-hour universally accessible voice messaging service to users of the service. It answers telephone calls and allows callers to leave messages when the users are unable to take calls. In addition, text messaging and e-mail services enable the carriers to provide a number of additional services including value-added features, such as converting or transcribing voice messages and sending via email or short message systems as texts and/or sending the corresponding voicemail audio file as e-mail attachments to others.

One such existing service is GoogleVoice™. It provides voicemail services along with other features, such as call history, conference calling, call screening, blocking of unwanted calls, and voicemail-to-text transcription services. Further, it provides users with voicemail services with indexable automated transcriptions of voicemail messages, which are accessible via a web browser, e-mail, or by phone.

Another existing service is YouMail™. It provides users with voicemail systems independent of the traditional wireless or landline carriers. YouMail™ provides features such as webmail-like voicemail access and transcription services of voicemail-to-text messages. Also, it enables a user to send transcribed texts to the user's mobile phone so that the user can preview before listening to received voicemail messages.

Other existing services with similar features are Voicecloud™, Jott™, and AT&T Wireless™. Also, nowadays, with a webcam, an enhanced mobile device, or similar technology, users of video mail services can create video messages by recording audio and video content (e.g., recording video clips) and send them to others' mobile devices on a mobile network or to e-mail addresses. Similar to voicemail, the users of the video mail services can access the recorded messages through a designated service provider or over the Internet.

There is, however, room for improvement to provide enhanced capabilities to edit the messages.

The existing services and/or applications do not provide users with capability to selectively modify or edit contents of received voice or video messages and their corresponding texts before forwarding to another person. That is, even if a user of a voicemail service desires to forward only desired portions of a received voice message, the user cannot do so by using existing services discussed above. In such a case, the user has to forward the received voice message in its entirety along with its transcribed text, although the voice message and its corresponding transcribed text may contain unnecessary or unwanted portions that the user does not want another person to hear or read about. As a result, with existing services the users often experience unnecessary frustration and sometimes embarrassment from sending unedited messages to another party, thereby tending to decrease effectiveness and/or customer satisfaction in communication via voice and/or video messages.

Hence, a need exists for providing users of electronic messaging services, such as voicemail and/or video mail containing a voice message in an audio portion of the message, with capabilities to easily modify the received voice and/or video message and corresponding transcribed texts so that the users of the electronic messaging services can modify and create new versions of the received messages and the corresponding texts before forwarding them to another person or storing the new versions for future use.

SUMMARY

The present teachings alleviate one or more of the above noted problems and improve on the ability of users of voice and/or video mail services to modify received voice and/or video messages and their transcribed texts. A user of voicemail and/or video mail services can modify (e.g., edit or annotate) a received original voice or video message in an electronic mailbox of the user. Also, the user can create and store modified versions of the received message and corresponding transcribed text for forwarding to another party for further communication. The user can save the modified versions of the messages for future use, such as integrating the modified versions in his or her presentations. This may reduce concerns about possible embarrassment or ineffective communication resulting from inability to modify received voice and/or video messages before forwarding.

The discussed examples include method and equipment for modifying a voice or video message having at least audio. A digital representation of a message is obtained from a mailbox of a user in a server and processed afterwards. Processing involves automatically converting (or transcribing) speech contained in the audio of the message to corresponding text, and presenting the corresponding text to a user. The corresponding text is modified in response to one or more user inputs in relation to the presentation of the text to the user. Also, the digital representation of the message, including the audio and/or video of the message, is modified in a manner corresponding to the modification of the corresponding text. The modified digital representation of the message is stored for further use.

Examples of the modification functions include various editing (e.g., selecting, copying, cutting, pasting, etc.) and annotating functions. The annotating functions may include annotating with voice and/or text notes.

One or more mailboxes can be used for the messages which can be voicemail or video mail messages. For example, a single mailbox may be used for both voice and video mail messages. Alternately, multiple mailboxes may be used for voicemails as well as video mails.

The equipment (or apparatus) for modifying the voice and/or video message can be a computer such as a server or a user (or client) terminal device. Examples of the user terminal device include various computers as well as smartphones and other mobile devices. The processor of the apparatus executes a program to process a digital representation of a message in a mailbox of a user to convert speech contained in audio of the message to corresponding text, and present the corresponding text to the user via various user interfaces. The apparatus modifies the corresponding text in response to one or more user inputs in relation to the corresponding text, modifies the digital representation of the message in a corresponding manner, and stores the modified digital representation of the message.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
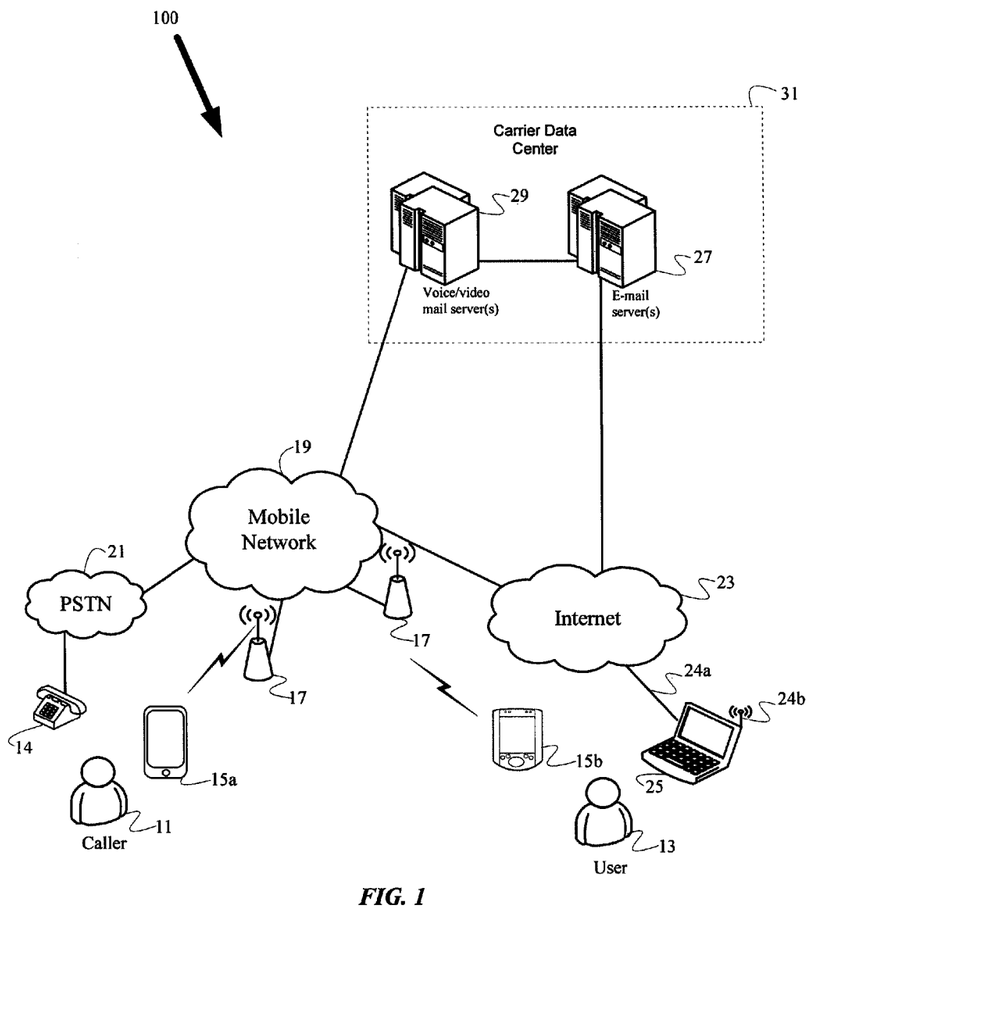
FIG. 1 is a general diagram illustrating a system offering a variety of communication services to mobile devices or users, including voice and/or video messaging services, where storyboard application software runs on a local user device.

FIG. 1 is a general diagram illustrating a system 100 offering a variety of communication services to users, including mobile telephone, landline telephone, voice and/or video mail and messaging services, etc. The mail and associated message modification services may be provided in association with landline telephone services, in association with voice or video services over the Internet, etc. For discussion purposes, the example of FIG. 1 mostly focuses on services provided in association with communication services, e.g., to users 11 and 13 of mobile devices 15a and 15b that receive communication services from a carrier operated mobile network 19. In this first example, the message modification is implemented on a user terminal device, e.g., via a storyboard application program running on the user terminal device. In a later example (as in FIG. 3), the message modification is provided as an enhancement to a server, for example, via a storyboard application program running on one or more of the servers including mail and/or application servers.

The example in FIG. 1 also illustrates a case scenario where a caller 11 calls a user 13 using the caller's device such as a mobile device 15a via a mobile network 19 or a landline telephone 14 via Public Switched Telephone Network (PSTN) 21. The mobile devices 15a and 15b are examples of mobile stations that may be used for voice as well as video data services. Here, other communications devices, such as tablets and notebook or netbook computers may be used in place of the illustrated, smartphone type mobile devices. The mobile network 19 provides mobile traffic services to mobile devices 15a and 15b via a number of base stations 17. The present teachings may be implemented in any of a variety of available mobile networks and/or on any type of mobile device compatible with such mobile network 19. For purposes of discussion, FIG. 1 shows only a few relevant elements of the mobile network 19.

The mobile network 19 might be implemented as a network conforming to a cellular standard, such as Long Term Evolution (LTE), Global System for Mobile Communications (GSM), Code Division Multiple Access (CDMA), etc. The LTE standard supports a full Internet Protocol (IP) network architecture and is designed to support voice as well as data in the packet domain. That is, in a LTE network voice calls are treated as data packets and get Voice-over-IP (VoIP) services. The mobile devices 15a, 15b or the like are capable of voice communications through the mobile network 19, and/or the Internet 23, and for various data services, they are capable of data communications through a particular type of the mobile network 19 (and the users thereof will have subscribed to data service through the network). In addition, a user device 25 including a tablet, netbook, or notebook computer or the like is connected to the Internet 23 via wired or wireless connections 24a and 24b for accessing various services including electronic mail services such as voicemail, and/or video mail services.

The mobile network 19 allows users of mobile devices 15a and 15b to initiate and receive telephone calls to and from another person. In the example, a caller 11 can initiate a call to a user 13 via a landline telephone station 14 connected to the PSTN 21, or, alternately, the caller 11 can call the user 12 via a mobile device 15a over the mobile network 19. Further, the call may be a voice call, a video call, or other multimedia based calls supported by the system 100. As discussed in more detail later, the call includes at least an audio component for speech communication. The mobile network 19 also offers a variety of communication services via the Internet 23, including e-mail service, text messaging service, voicemail service, video mail service, etc.

In the example, mobile devices 15a and 15b can take the form of portable handsets, smart-phones, portable or tablet computers, or personal digital assistants, etc. although they may be implemented in other form factors. Program applications and/or any application purchased on-line via a network can be configured to execute on many different types of mobile devices.

In addition, the system 100 includes other elements that support various value-added services, such as voice-to-text transcription services, multimedia based services, as well as the e-mail services, voicemail and/or video mail services. Specific elements of the mobile network 19 and the Internet 23 for carrying voice, video, and data traffic (including multimedia contents) and for controlling various aspects of the calls or data sessions through the mobile network 19, the Internet 23, and other networks are omitted here for simplicity. It will be understood that the various network elements can communicate either directly or indirectly with each other, other aspects of the mobile network 19, the Internet 23, and other networks including the PSTN 21.

The mail and associated message processing services can be provided in various ways, e.g., by value-added service providers having server equipment connected to the Internet 23 and/or via a gateway to the mobile network 19. The example, however, illustrates an implementation in which the carrier that provides the mobile communication service throughout the mobile network 19 provides the mail and associated message processing services to its mobile customers 11 and 13. Also, shown in FIG. 1 is a data center 31 operated by the carrier. Specifically, for various messaging services, the carrier operates the data center 31 which includes other equipment and servers including those shown here—voice and/or video mail server(s) 29 for voicemail and/or video mail services and e-mail server(s) 27 for e-mail services for users of various mobile devices, 15a, 15b or the like and other user devices 25 or the like. The data center 31 typically houses other critical operational equipment (not shown) that form a backbone of operations for the carrier. However, for simplicity purposes, FIG. 1 shows only servers 27 and 29 as part of the data center 31. A person skilled in the art would also recognize that systems outside of the carrier network (e.g., systems provided and/or serviced by a third party) could provide the same or similar functions of the data center 31 as well. That is, the services and functionalities discussed here can be provided by a separate entity (alone or through agreements with the carrier) other than the carrier.

In the example, the data center 31 enables the carrier provided services including digital messaging services such as voicemail, video mail, e-mail, text messaging, etc. through its various equipment, e.g., the voice and/or video mail server(s) 29 and e-mail server(s) 27. The voice and/or video mail server(s) 29 may be one or more servers equipped with capabilities to support voicemail services (or video mail services) and applications which allow storage of voice and/or video messages that can be retrieved later by users of the services. In the example, when the caller 11 calls the user 13 using the caller's mobile device 15a or landline telephone 14 and the user 13 does not answer, the call is routed to the voice and/or video mail server(s) 29. The caller 13 is then prompted to leave a voice message. When the caller 13 leaves the voice message for the user 13 in the user's mailbox, the voice message is saved and stored in the mailbox in the voice and/or mail server(s) 29. Then an electronic notification is sent to the user 13 informing the user 13 of the presence of the voice message from the user's mailbox. The user 13 can access and retrieve the voice message in the user's mailbox, or forward the retrieved voice message to another person.

Some examples of voicemail services include remote answering machine service with touch-tones and audio messages as a user interface, and other input devices such as voice or a computer interface. Users can also play voice messages through their phones, retrieve their voice messages as e-mails or text messages, transfer and/or forward voice messages (or voicemails) to another person.

In the example, the e-mail server(s) 27 serve as an electronic post office for e-mails, providing a storage area where e-mails are stored for local users. They also provide storage areas for a database of user accounts that the e-mail server(s) 27 recognize, and communication modules that handle the transfer of messages to and from other e-mail servers and e-mail client devices. Using an e-mail client program a user can send and receive e-mails to and from other users via the e-mail server(s) 27 in a client server network environment.

The e-mail server(s) 27 could be a separate physical server as shown in FIG. 1, or it could be implemented as a program module running on the same hardware platform, e.g., as a server application running on the voice and/or video mail server(s) 29 or other servers. In this case, when the server application receives a service request from a client application on a user's device such as 15b, 25, or the like, the server application provides appropriate information allowing the user device 15b, 25, or the like access to various functions of the particular mail service.

As discussed earlier, in the example, a caller 11 calls a user 13 and leaves a voice (or video) message for the user 13. The voice (or video) message is then stored as a voicemail (or video mail) message in the user's mailbox in the voice and/or video mail server(s) 29. After storing the voice (or video) message in the user's mailbox, the voice and/or video mail server(s) 29 send a notification to the user 13 informing the user 13 of the receipt of the message in the user's mailbox. The notification can be made to the user 13 using various services, such as e-mail services, text messaging services, automated voice calls, etc. When the e-mail services are used, the user 13 receives an e-mail notification containing voice messages as attachments in various formats (e.g., MP3, WAV, AVI, 3GP, etc.) or a link to the voice messages in the e-mail notification. Alternately, the user 13 may use a client mail terminal (not shown) or client mail application running on the user devices 15b, 25b, or the like to check whether there is a voice (or video) message in the mailbox of the user 13, and select and retrieve any of the messages from the mailbox.

When the user 13 receives the e-mail notification of the voice message in the mailbox, the user 13 can listen to the voice message, attached as an audio file, by using any audio and/or video application software (e.g., Windows Media Player™, iTunes™, etc) running on the user device 15b, 25, or the like. In this first example, when the user 13 desires to modify the received voice message (or video message), the user terminal device executes a software implementation of the digital message modification function (hereinafter, "storyboard application (SA) software") running locally on the user's device 15b, 25, or the like as shown in FIG. 1.

For implementing the SA software on a computer, various programming languages such as Java, C, C++, and other software languages can be used. For example, a mobile station application can be written to execute on a binary runtime environment for BREW based mobile stations, Windows Mobile based mobile stations, Android based mobile stations, Apple iOS based mobile stations, Java Mobile based mobile stations, or RIM based mobile stations, or the like. Some of these types of devices can employ a multi-tasking operating system as well.

Figure 2:
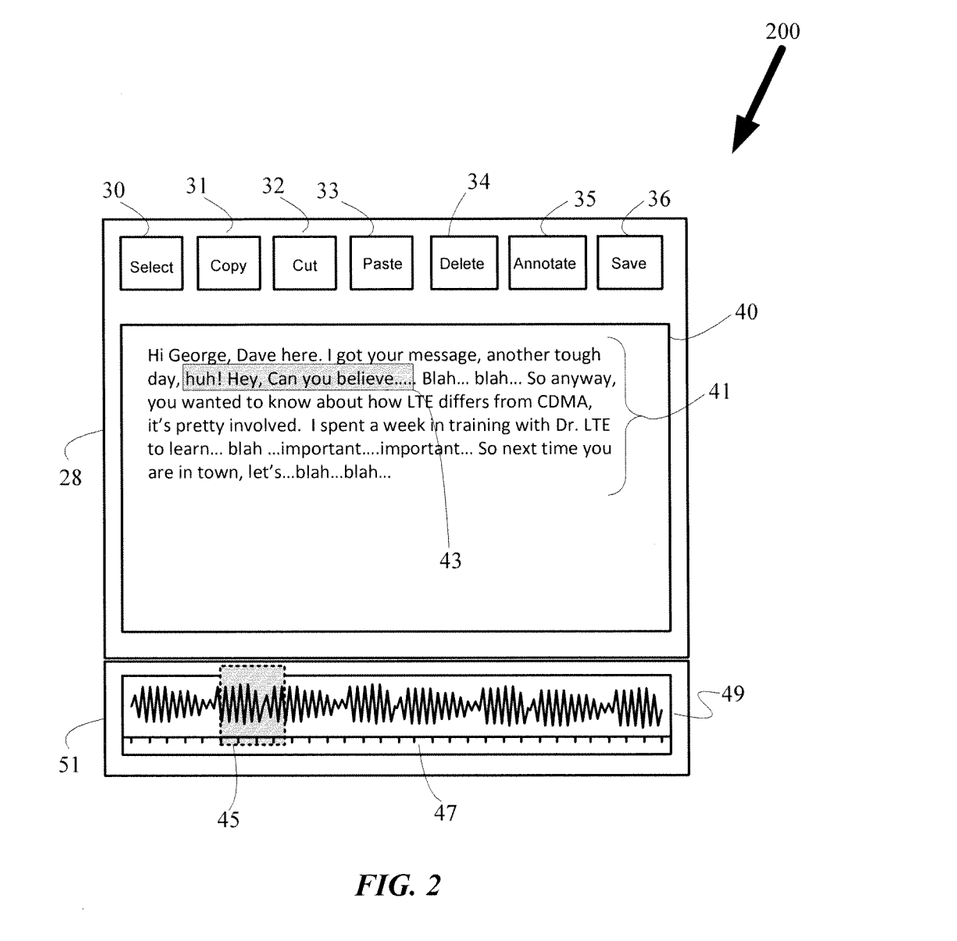
FIG. 2 illustrates an example of a graphical user interface for storyboard application software for modifying digital messages.

The SA software takes, as an input, a voice message file (or a video message file in cases of video mail), automatically transcribes the voice message to corresponding text and drives the display of the user terminal device (or user device) to present the corresponding text to the user 13, typically via a graphical user interface on the user device. Alternately, the SA software is capable of accepting, as inputs, voice and/or video message files and the transcribed texts generated by third party software or equipment outside. In either case, running on the user device such as a mobile device 15b, or a tablet, netbook, or notebook computer 25, or the like, the SA software causes the user device to present the transcribed text to the user 13 so that the user 13 can modify the voice and/or video message and the corresponding, transcribed text. The presentation of the text to the user 13 can be made via a graphical user interface (GUI) 200 or other user interface including a web-browser type interface on the user's various devices. Also, the SA software maintains synchronization of the underlying audio data of the voice and/or video message and the corresponding, transcribed text presented to the user 13 by various techniques based on time-stamps, word indexes, line numbers, etc. As the user 13 modifies the corresponding, transcribed text, the voice and/or video message data (or underlying audio data) is also modified in the same manner as the corresponding, transcribed text is modified.

Now, having described various aspects of a network environment in FIG. 1, other implementation aspects of the SA software running on the user device 15b, 25, or the like are discussed below; specifically a graphical user interface to the SA software implementation is described.

FIG. 2 illustrates an example of the graphical user interface (GUI) 200 for storyboard application (SA) software for modifying digital messages including voice and/or video messages. The SA GUI 200 may be presented on any of the various types of user devices discussed above. Also, for the purpose of illustration, discussion below is limited to voice mail messages, but the process and techniques can be applied to video mail or other multimedia based mail messages that include at least audio message content.

As mentioned earlier, the SA software can be a native software application that runs as a standalone application on a local machine, such as the user device 15b, 25, or the like. The SA software accepts, as an input, an audio file containing a voice message in various formats, such as MP3, WAV, etc. In the example, when the audio file containing the voice message is inputted to the SA software, the SA software causes the particular user device to automatically transcribe the voice message in the audio file to corresponding text, and generate the corresponding text. Alternately, the voice message in the audio file can be transcribed by third party software other than the SA software, and the transcribed text can be supplied to the SA software as an input. The third party software can reside on the user device or on separate equipment. Once the corresponding text is obtained, the SA software presents the corresponding text to the user 13 via a graphical user interface similar to the GUI 200 for further processing, while maintaining synchronization between the corresponding text and the underlying audio file. Specifically, as shown in FIG. 2, the SA software presents to the user 13 the transcribed text via the graphical user interface (GUI) 200 so that the user 13 can modify, e.g., edit and/or annotate, the received voice message according to the user's various needs.

FIG. 2 is a simple exemplary graphical user interface for the SA software for the purpose of conceptual illustration. It is well known to one of ordinary skill in the art of GUI design and implementation that other designs, formats, and variations are possible and can be employed to implement various functions of the SA software functionalities, such as editing and annotating functions.

The GUI 200 includes two windows—a top window 28 and a bottom window 51. The top window 28 includes a number of user selection buttons 31, 33, 35, 27, and 39, and a text box 40, for displaying to the user 13 various user selectable operations and transcribed texts of the voice messages. The text box 40 includes a transcribed text body 41 of the voice message contained in an audio data file (not shown). When the audio data file is inputted to the SA software, corresponding text is automatically generated and presented to the user 13 as the transcribed text body 41, and the transcribed text body 41 is internally synchronized to the underlying audio data. The user device offers a scrolling or page turning capability for instances in which the text is larger than what can be displayed in the top window 29. That is, when the voice message is too long for the memory in the user device to present the text in the top window 29, the scrolling or page turning feature allows the user to view the remaining portion of the text. The bottom window 51 includes a graphical display of a frequency domain representation (a "spectral diagram") 49 on a timeline 47 of the voice message or speech contained in the audio data file. Based on the spectral diagram of the voice message, the user can edit out sounds in the voice message that do not correspond to the text. For example, the user 13 can edit out something that is unintelligible, cannot be transcribed, or would not be transcribed, but is included in the underlying audio data.

In order to maintain the synchronization (or correlation) between the transcribed text body 41 and the underlying audio data, the SA software utilizes any of a number of available techniques based on time-stamps, indexes, line numbers, word numbers, or the like. In one implementation, the underlying audio data file contains time-stamp information for the audio data and the transcribed text generated from the underlying audio data contains corresponding time-stamp information. The time-stamp information can be associated with each word or a text segment of the transcribed text. As a result, when the user 13 selects a certain portion 43 of the transcribed text body 41, based on the time-stamp and/or index information of the selected portion of the transcribed text body 41, the SA software internally searches the underlying audio data, locates and selects a corresponding portion of the audio data by means of the corresponding time-stamp and/or index information.

In addition, in the bottom window 51 of the GUI 200, the spectral diagram 49 of the voice message in the original audio data is also displayed to the user 13. The spectral diagram 49 is also internally synchronized and correlated with the transcribed text body 41 in a manner similar to the techniques described above. That is, if a portion 43 of the transcribed text body 41 is selected by the user 13 (e.g., by highlighting a portion of the transcribed text body 41, as shown by a highlighted text 43), a corresponding portion of the underlying audio data is selected internally based on the corresponding time-stamp information (or indexing, line numbers, word numbers, or the like), and, in relation to the highlighted text 43, a corresponding portion of the spectral diagram 49 is selected and displayed in a dotted box 45 for presentation to the user 13.

Also, as shown, the GUI 200 presents to the user 13 various user selectable buttons (or keys, or the like) in the top window 29, corresponding to various modification operations, such as selecting, copying, cutting, pasting, deleting, and annotating text. It is appreciated that one skilled in the art of designing GUIs and graphical editor interfaces or the like can implement these and other modification functions using various other forms, designs, and formats. In the example, a few functions (or operations) are shown for illustrative purposes. Each function (or operation) is performed and effected in response to the user's various inputs—selecting various buttons, such as a Select button 30 for selecting a portion of the text body 41, a Copy button 31 for copying a portion of the text body 41, a Cut button 32 for cutting out a portion of the text body 41, a Paste button 33 for pasting a selected portion of the text body 41, a Delete button 34 for deleting a selected portion of the text body 41, an Annotate button 35 for annotating a part of the text body 41 with voice or text notes, and a Save button 36 for saving modified versions of the text body 41 and its corresponding audio data. On a touch screen device, the user merely touches the location on the screen corresponding to the desired one of the buttons above. Alternately, on other types of devices, the user may operate a mouse, touch pad or the like to move a cursor and select a button for any desired editing operation.

In addition, if desired, a user can annotate the text body 41 by adding texts or voice notes. For annotating the text of the voice message, the user can select a desired portion of the text body 41 and add text or voice notes by selecting the Annotate button 35 and inputting the desired text or voice notes. The SA software internally adds the text or voice notes to the underlying audio data, while maintaining internal synchronization between the corresponding text and the underlying audio data. Further, the SA software can convert text notes to voice notes or vice versa. Alternately, the text notes can be converted to speech (or audio) and appended or inserted into the underlying audio data. In cases of video messages, the user can annotate by recording a new video message clip and inserting (or appending) into the underlying video data.

As discussed earlier, the transcribed, corresponding text of the text body 41 and its underlying audio data file are internally synchronized by the SA software using various techniques based on internal time-stamps, indexes, line numbers, word numbers, reference points, etc. As a result, any operation by the user 13 for modifying the transcribed text body 41 results in the same operation performed internally to the underlying audio data. That is, when the user 13 performs any modification operation (e.g., selecting, cutting, pasting, deleting, annotating, etc.) to the text body 41, the same modification operation is internally performed to the underlying original audio data by the SA software. For example, if the user selects the Delete button 34 while the portion 43 of the text is highlighted, the text portion 43 and corresponding audio of the underlying audio data for the highlighted timeframe 45 are both deleted.

After modifying the transcribed text of the voice message and its underlying audio data file, the user 13 can create new versions of the voice message as well as the transcribed text by selecting the Save button 36 in the GUI 200. When the Save button 36 is selected, the SA software creates new modified versions of the transcribed text and its underlying audio data. As a result, the newly created transcribed text and the underlying audio data file contain just desired, edited portions of the received voice message by the user 13. Further, the user 13 can send the newly created audio data file (or a new video file in case of a video message) in various formats and the modified transcribed text to another person as e-mail attachments or store locally for future use on the user's device, such as a mobile device 15b, a laptop computer 25, or the like.

Figure 3:
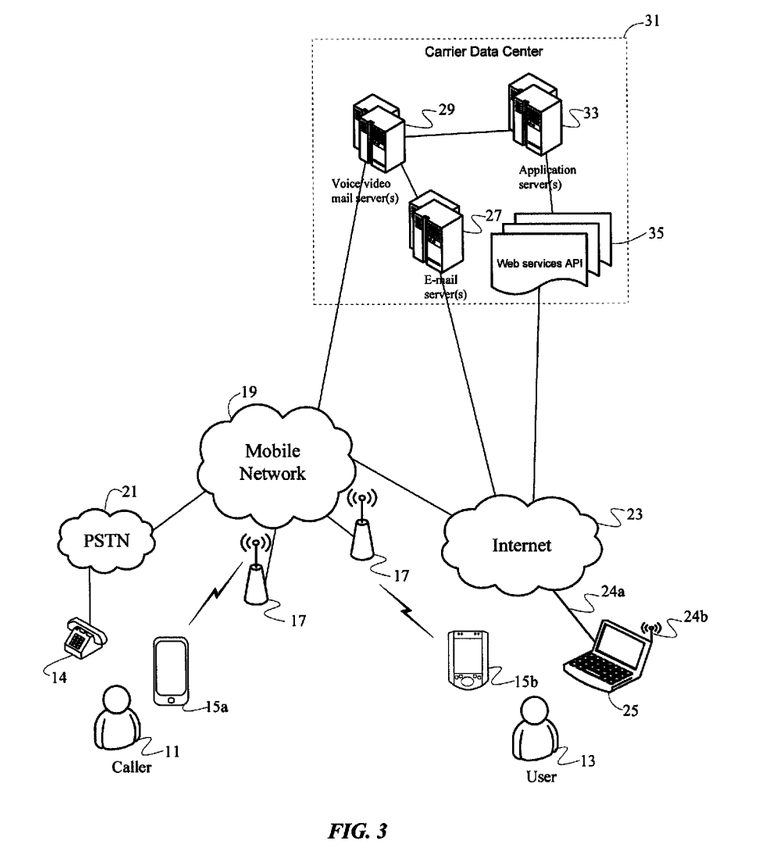
FIG. 3 illustrates a simplified, high level diagram of a system implementing a storyboard application in a client-server model, where storyboard application software runs on a server.

The examples of FIGS. 1 and 2 relied on an approach where the SA software runs locally on the user device, such as a mobile device 15b, a notebook computer 25, or the like. An alternative approach implements the SA software on a server platform, and the user device implements a more generic functionality such as a client browser. For discussion of the latter approach, FIG. 3 illustrates an implementation in a client-server environment. In this client-server environment, a remote server platform or application server(s) implements the SA software functionality, and the user is provided with a web-browser type interface to gain access to the functionality of the SA software. In other words, the SA programming is implemented in a remote server on a network and the user 13 gains access to various functions of the SA software remotely from the user's device, acting as a client terminal, such as a mobile device 15b, a laptop computer 25, or any other computing device (not shown), or the like. More specifically, the user 13 gains access to the various functions of the SA software implemented in the remote server via web services Application Programming Interfaces (APIs) 35 and a web-browser type interface on the user's terminal device. Alternately, the disclosed teachings herein can also be implemented as a cloud based solution (also known as Software as a Service) in which the SA software and its associated data are hosted in the Internet cloud and are accessed by the user using a web browser on a user's device (or client terminal) over the Internet.

In the example of FIG. 3, as similarly discussed earlier, a caller 11 calls and leaves a voice message for a user 13 in the mailbox of the user 13, which is located in the voice and/or video mail server(s) 29 or the like. The voice message is stored in the mailbox in the voice and/or video server(s) 29 or the like for a predetermined period of time defined by the user 13 and/or a carrier. After the caller 11 leaves the voice message for the user 13 in the user's mailbox, the voice and/or video server(s) 29 sends to the user 13 an electronic notification of the voice message received via various communications services, such as text messaging services, e-mail services, automated call services, or the like. In the example, an e-mail notification is generated and sent to the user 13 via e-mail server(s) 27. The e-mail notification includes an embedded link to the voice message stored in the user's mailbox or can include an audio file containing the voice message as an e-mail attachment. Alternately, the user 13 can check whether there is a voice message in the user's mailbox by using a client mail terminal (not shown) or using a client mail application software running on the user's device, such as a mobile device 15b, a laptop computer 25, or the like. In addition, the voice and/or video server(s) 29 can be equipped with capabilities to transcribe a voice message to corresponding text and to send the voice message as an audio file (e.g., MP3, WAV, etc.) or video file and the corresponding transcribed text to the e-mail server(s) 27.

Further, in FIG. 3, the application server(s) 33 are equipped with the SA software functionalities. In the example, the SA software is implemented in the application server(s) 33 so that the application server(s) 33 can receive audio and/or video data files containing voice messages from the voice and/or video mail server(s) 29. Also, the application server(s) 33 are equipped with capabilities to automatically transcribe the received voice and/or video messages to corresponding texts, generate the corresponding texts, synchronize the corresponding texts to the underlying audio or video data, and to store the synchronized, corresponding texts and corresponding underlying audio and/or video data file in the application server(s) 33. As mentioned earlier, through a set of Application Programming Interfaces (APIs) 35, the application server(s) 33 provide the user 13 with remote access to various functionalities of the SA software implemented in the application server(s) 33.

Also, an e-mail notification to the user 13 by the voice and/or video server(s) 29 via e-mail server(s) 27 contains an embedded or Uniform Resource Locator (URL) link to web services which are accessible through the APIs 35. In the example, the APIs 35 are a defined set of Hypertext Transfer Protocol (HTTP) request messages in an Extensible Markup Language (XML) or JavaScript or its variants for accessing various functionalities of the SA software implemented in the one or more application servers 33.

Acting as remote procedure calls, the APIs 35 for the SA software implemented in the application server(s) 33 enable the user 13 on the user's local device to access various functions of the SA software. As a result, the user 13 on the local device 15b, 25, or the like, acting as a client terminal, can access, via the APIs 35 and web-based browser type user interfaces (i.e., one similar to the GUI 200), various functionalities of the SA software running on the application server(s) 33. That is, the user 13 on the local device can access the user's voice (or video) message remotely from the local device and modify them through the APIs 35 and the application server(s) 33 according to the user's various needs. The user 13 can then save the modified versions of the voice (or video) message including modified corresponding text and modified underlying audio (or video) data in a storage medium of the application server(s) 33.

As mentioned earlier, the SA software takes, as an input, a voice (or video) message, and automatically converts or transcribes the received voice (or video) message to corresponding text and generates the corresponding text for presentation to the user 13 on the user's local device. Alternately, the voice (or video) message can be transcribed to text and supplied to the SA software by a third party application residing in the application server(s) 33 or other equipment.

When the user 13, using the web browser type editing interface on the user's local device, makes a request to the application server(s) 33 to modify the received voice message, the transcribed text generated by the application server (s) 33 is sent to the user's local device and presented to the user 13 via the web browser type editing interface with similar functionalities as those of the GUI 200. Thus, using the web browser type editing interface and the APIs 35, the user 13 can perform a series of editing operations and modify (e.g., edit or annotate) the presented transcribed text and its underlying audio data stored in the application server(s) 33. That is, as the user 13 performs any of modifying operations, such as selecting, cutting, pasting, copying, deleting, annotating, etc. on the presented transcribed text on the user's local device, the same operation is performed in the same manner onto the underlying audio data in the application server(s) 33. This is again accomplished by the synchronization maintained by the SA software between the presented transcribed text and its underlying audio data in the application server(s) 33. The modified versions of the received voice (or video) message including the modified transcribed text and modified underlying audio data are stored in a storage medium of one or more application servers 33.

As a result, the user 13 can create a new version of the modified voice (or video) message that contains only desired portions of the original voice (or video) message. For example, when the user selects to create and save the modified voice (or video) message, the SA software implemented in the application server(s) 33 creates and saves in the application server(s) 33 the modified transcribed text and its corresponding modified underlying audio data. Alternately, the user 13 can save the modified voice (or video) message (e.g., the modified, transcribed text and modified, underlying audio data) on the user's local device, such as a mobile device 15b, a notebook computer 25, or the like for forwarding to another person as e-mail attachments or for future use.

In addition, the user 13 can send the modified voice message to a phone number as another voice message so that a new recipient can hear or retrieve it on his or her mobile device. Further, in place of the web browser type editor interface (or client application) for modifying digital mail messages, a native mobile device application, such as Apple iOS, Android, RIM Blackberry, Windows Phone, PalmOS applications may be used as well. It is also noted that each electronic mail service, such as voicemail, video mail, and e-mail service discussed above, may also be implemented on a plurality of servers across a network.

Aspects of the techniques outlined above are implemented on general purpose computers programmed to operate as various servers. Other aspects are implemented on user terminal devices, including general purpose type user computers and/or smartphone type mobile devices. The software functionalities involve programming, including executable code as well as associated stored data, e.g., files used for voicemail and/or video mail services, e-mail services, storyboard application software for modifying digital messages including voice and/or video messages, etc. The software code is executable by the processor of a general-purpose computer platform that functions as an application server and/or the processor of a smartphone or computer that functions as a client terminal device for various services including services or functions provided by the storyboard application software for modifying digital messages including voice and/or video messages. In operation, the code is stored within the computer platform of the server or in the terminal device. At other times, however, the software may be stored at other locations and/or transported for loading into the appropriate computer or terminal device. Execution of such code by a processor of the respective platform enables the platform to implement the methodology or various functions for modifying digital messages in essentially the same manner performed in the implementations discussed and illustrated herein.

Figures 4, 5:
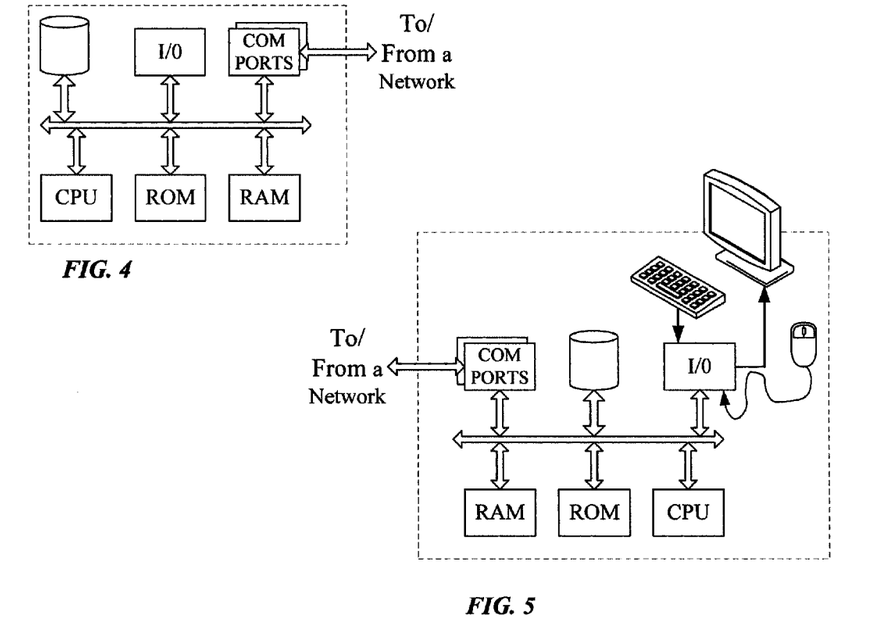
FIG. 4 illustrates a simplified, high level diagram for a network or host computer platform.
FIG. 5 illustrates a simplified, high level diagram for a client computer platform.

FIGS. 4 and 5 provide functional block diagrams illustrating general purpose computer hardware platforms. FIG. 4 illustrates a network or host computer platform, as may typically be used to implement a server. FIG. 5 depicts a computer platform with user interface elements, as may be used to implement a personal computer or other type of work station or terminal device, although the computer platform of FIG. 5 may also act as a server if appropriately programmed. It is believed that those skilled in the art are familiar with the structure, programming and general operation of such computer equipment, and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a personal computer (PC), tablet computer, or similar device, includes a data communication interface, CPU, main memory, and one or more mass storage devices for storing user data and the various executable programs. A mobile device may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch-sensitive display screens, instead of separate keyboard and cursor control elements. The hardware elements, operating systems, and programming languages of such user terminal devices also are conventional in nature, and it is presumed that those skilled in the art are adequately familiar therewith.

Hence, various aspects of the methods for modifying digital mail messages including voice messages in voicemail (or video messages in video mail) outlined above may be embodied in programming. Program aspects of the technology may be thought of as "products" or "articles of manufacture"

typically in the form of executable code and/or associated data that is carried on or embodied in a type of machine readable medium, such as a storage device or other tangible non-transitory type media or a signal media for carrying the software through the Internet or various other telecommunication networks.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising steps of:
obtaining a digital representation of a message having at least audio from a mailbox of a user in a server;
automatically converting, by a processor, speech contained in the audio of the message to corresponding text;
automatically converting, by the processor, the audio of the message to a corresponding spectral diagram, the spectral diagram being a frequency domain representation of the audio of the message;
presenting a unified display on a computing device screen containing both the text and the spectral diagram to the user;
automatically editing the text in response to one or more user inputs in relation to the presentation of the text;
using the spectral diagram to remove sound in the audio that does not correspond to the text; automatically editing, by the processor, the digital representation of the message, including the audio of the message, in a manner corresponding to the editing of the text;
annotating the text in response to one or more user inputs in relation to the presentation of the text;
annotating the digital representation of the message, including the audio of the message, in a manner corresponding to the annotating of the text; and
storing, in the server, the edited and annotated digital representation of the message.

2. The method of claim 1, further comprising synchronizing the corresponding text to the audio of the message.

3. The method of claim 2, wherein the synchronization of the corresponding text to the audio of the message is based on timestamp information.

4. The method of claim 1, wherein the server is a mail server, the message is a voicemail message and the mailbox is a voicemail mailbox.

5. The method of claim 1, wherein:
the message further has video and the mailbox is for video mail; and
the step of editing the digital representation of the message further includes editing the video of the message in a manner corresponding to the editing of the text.

6. The method of claim 1, wherein the annotation includes at least one of text inputted by the user or voice inputted by the user.

7. A server, comprising:
an interface for network communication;
a processor coupled to the interface;
a program for the processor; and
storage for the program and for a mailbox of a user,
wherein execution of the program by the processor causes the server to perform functions, including functions to:
process a digital representation of a message in the mailbox of the user to convert speech contained in audio of the message to corresponding text;
process the digital representation of the message to convert the audio of the message to a corresponding spectral diagram, the spectral diagram being a frequency domain representation of the audio of the message;
present a unified display on a computing device screen containing both the text and the spectral diagram to the user;
automatically edit the text in response to one or more user inputs in relation to the presentation of the text;

use the spectral diagram to remove sound in the audio that does not correspond to the text; automatically edit, by the processor, the digital representation of the message including the audio of the message, in a manner corresponding to the editing the text;

annotate the text in response to one or more user inputs in relation to the presentation of the text;

annotate the digital representation of the message, including the audio of the message, in a manner corresponding to the annotating of the text; and store, in the server, the edited and annotated digital representation of the message.

8. The server of claim 7, wherein the execution of the program by the processor causes the server to perform further a function to synchronize the corresponding text to the audio of the message.

9. The server of claim 7, wherein the synchronization of the corresponding text to the audio of the message is based on timestamp information.

10. The server of claim 7, wherein the message is a voicemail message and the mailbox is a voicemail mailbox.

11. The server of claim 7, wherein:
the message further has video and the mailbox is for video mail; and
the function to edit the digital representation of the message further includes editing the video of the message in a manner corresponding to the editing of the text.

12. The server of claim 7, wherein the function to annotate the text adds at least one of text received from the user or voice received from the user.

13. The server of claim 12, wherein the function to annotate the text converts the text into corresponding audio.

14. A user terminal device, comprising:
an interface for network communication;
a processor coupled to the interface;
a program for the processor; and
storage for the program and for a digital representation of a message having at least audio, obtained from a mailbox of a user in a server,
wherein execution of the program by the processor causes the user terminal device to perform functions, including functions to:
process the digital representation of the message to convert speech contained in the audio of the message to corresponding text;
process the digital representation of the message to convert the audio of the message to a corresponding spectral diagram, the spectral diagram being a frequency domain representation of the audio of the message;
present a unified display on a computing device screen containing both the text and the spectral diagram to the user;
automatically edit the text in response to one or more user inputs in relation to the presentation of the text;
use the spectral diagram to remove sound in the audio that does not correspond to the text; automatically edit, by the processor, the digital representation of the message including the audio of the message, in a manner corresponding to the editing of the text;
annotate the text in response to one or more user inputs in relation to the presentation of the text;
annotate the digital representation of the message, including the audio of the message, in a manner corresponding to the annotating of the text; and
store, in the server, the edited and annotated digital representation of the message.

15. The user terminal device of claim 14, wherein the execution of the program by the processor causes the user terminal device to perform further a function to synchronize the corresponding text to the audio of the message.

16. The user terminal device of claim 15, wherein the synchronization of the corresponding text to the audio of the message is based on timestamp information.

17. The user terminal device of claim 14, wherein the message is a voicemail message.

18. The user terminal device of claim 14, wherein:
the message further has video; and
the function to edit the digital representation of the message further includes editing the video of the message in a manner corresponding to the editing of the text.

19. The method of claim 1, further comprising synchronizing the spectral diagram to the corresponding text.

20. The method of claim 19, further comprising:
adding an annotation to at least one of the spectral diagram or the text in response to one or more user inputs in relation to the presentation of the spectral diagram; and
annotating the digital representation of the message, including the audio of the message, in a manner corresponding to and in response to the annotation added to the at least one of the spectral diagram or the text.

21. The server of claim 7, wherein the execution of the program by the processor causes the server to perform further a function to synchronize the spectral diagram to the corresponding text.

22. The server of claim 21, wherein the server is caused to perform further functions to:
add an annotation to at least one of the spectral diagram or the text in response to one or more user inputs in relation to the presentation of the spectral diagram; and
annotate the digital representation of the message, including the audio of the message, in a manner corresponding to the annotation added to the at least one of the spectral diagram or the text.

23. The user terminal device of claim 14, wherein the execution of the program by the processor causes the user terminal device to perform further a function to synchronize the spectral diagram to the corresponding text.

24. The user terminal device of claim 23, wherein the execution of the program by the processor causes the user terminal device to perform further functions to:
add an annotation to at least one of the spectral diagram or the text in response to one or more user inputs in relation to the presentation of the spectral diagram; and
annotate the digital representation of the message, including the audio of the message, in a manner corresponding to and in response to the annotation added to the at least one of the spectral diagram or the text.

* * * * *